United States Patent [19]

Rieber et al.

[11] Patent Number: 5,133,569

[45] Date of Patent: Jul. 28, 1992

[54] TRAINING WHEEL ASSEMBLY FOR BICYCLE

[75] Inventors: Frederick M. Rieber; Richard A. Daley, both of Providence, R.I.

[73] Assignee: Playskool, Inc., Pawtucket, R.I.

[21] Appl. No.: 633,071

[22] Filed: Dec. 24, 1990

[51] Int. Cl.[5] ............................................. B62H 1/12
[52] U.S. Cl. .................................. 280/293; 280/295; 280/755; 180/209
[58] Field of Search ............... 280/755, 293, 296, 298, 280/304, 763.1, 767, 295, 297, 299, 300; 180/209

[56] References Cited

U.S. PATENT DOCUMENTS

| | | | |
|---|---|---|---|
| D. 149,243 | 4/1948 | Bashaw et al. | D34/15 |
| D. 167,697 | 9/1952 | Kosack . | |
| D. 168,202 | 11/1952 | Wilkens . | |
| D. 169,391 | 4/1953 | Ring . | |
| D. 173,777 | 1/1955 | Abel . | |
| D. 217,525 | 5/1970 | Takashima . | |
| D. 220,600 | 4/1971 | Hill . | |
| 566,071 | 8/1896 | Flatt | 280/304 |
| 708,809 | 9/1902 | Hayes | 280/296 |
| 2,209,804 | 7/1940 | Ashley | 180/209 |
| 2,450,979 | 10/1948 | Moller | 280/293 |
| 2,647,764 | 8/1953 | Anderson | 280/293 |
| 3,401,954 | 9/1968 | Brilando | 280/293 |
| 3,642,305 | 2/1972 | Pawsat | 280/293 |
| 4,350,222 | 9/1982 | Lutteke et al. | 180/209 |
| 4,615,535 | 10/1986 | McMurtrey | 280/293 |
| 4,730,840 | 3/1988 | Goldmeier | 280/293 |

FOREIGN PATENT DOCUMENTS

| | | | |
|---|---|---|---|
| 0470234 | 6/1914 | France | 280/293 |
| 0015172 | of 1896 | United Kingdom | 280/293 |

*Primary Examiner*—Kenneth R. Rice
*Attorney, Agent, or Firm*—Salter & Michaelson

[57] ABSTRACT

A training wheel assembly includes a pair of training wheels and a pair of mounting members for mounting the training wheels in outwardly spaced relation to opposite sides of a rear wheel of a bicycle. The training wheel assembly is adjustable for moving the training wheels thereof inwardly relative to the rear wheel of a bicycle in order to reduce the amount of support provided by the training wheels without increasing the tendency of the bicycle to yaw or wobble from side-to-side during use.

9 Claims, 3 Drawing Sheets

TRAINING WHEEL ASSEMBLY FOR BICYCLE

BACKGROUND AND SUMMARY OF THE INVENTION

The instant invention relates to bicycles and more particularly to a training wheel assembly for a bicycle which is adjustable to compensate for the level of skill of an operator thereof.

Training wheel assemblies have generally been found to be effective for aiding young children in the development of bicycling skills. In this regard, a conventional training wheel assembly generally comprises a pair of training wheels and a pair of brackets which are operative for mounting the training wheels adjacent opposite sides of the rear wheel of a bicycle. It has been found that a training wheel assembly of this type can be effectively utilized for increasing the stability of a bicycle so that a young rider can more easily develop his or her balancing skills while learning to ride the bicycle.

Most of the heretofore available training wheel assemblies have been adapted so that they are adjustable for raising the training wheels thereof as a rider develops his or her riding skills. However, it has been found that when the wheels of a training wheel assembly on a bicycle are adjusted upwardly to reduce the amount of support which they provide the bicycle inherently becomes more unstable, and it has a tendency to wobble from side-to-side unless the rider is sufficiently skillful at riding the bicycle so as to make the training wheels essentially unnecessary.

Training wheel assemblies of the above described general type are disclosed in the U.S. Patents to Kosack U.S. Pat. No. Des. 167,697; Wilkens U.S. Pat. No. Des. 168,202; Abel U.S. Pat. No. Des. 173,777; Takashima U.S. Pat. No. Des. 217,525; Anderson U.S. Pat. No. 2,647,764; Brilando U.S. Pat. No. 3,401,954; Pawsat U.S. Pat. No. 3,642,305; and McMurtrey U.S. Pat. No. 4,615,535. Other types of training wheel assemblies which, in addition to the ones disclosed in the above references, represent the closest prior art to the subject invention of which the applicant is aware are disclosed in the U.S. Patents to Bashaw et al U.S. Pat. No. Des. 149,243; Ring U.S. Pat. No. Des. 169,391; Hill U.S. Pat. No. Des. 220,600; Moller U.S. Pat. No. 2,450,979; and Goldmeier U.S. Pat. No. 4,730,840. However, these references fail to disclose a training wheel assembly which is adjustable inwardly relative to the rear wheels of a bicycle rather than upwardly, and hence they are believed to be of only general interest with respect to the subject invention.

The instant invention provides an effective training wheel assembly for a bicycle which is adjustable for reducing the level of support provided by the training wheel assembly as the level of skill of a rider is increased, but which is normally operative without allowing the bicycle to wobble from side-to-side during use, even when the level of support provided by the training wheel assembly is reduced. More specifically, the instant invention provides an effective training wheel assembly comprising a pair of training wheels and means for mounting the training wheels adjacent opposite sides of the rear wheel of a bicycle so that the training wheels can be adjusted inwardly rather than upwardly to reduce the level of support provided by the training wheels. Still more specifically, the mounting means is adapted for mounting the training wheels so that they are positioned in outwardly spaced relation to opposite sides of the rear wheel of a bicycle and operative for contacting a supporting surface on which the bicycle is received in order to maintain the bicycle in a substantially upright disposition. Further, the mounting means is adapted so it is adjustable for moving the training wheels between respective first positions thereof wherein they are spaced outwardly from the rear wheel of the bicycle by a first predetermined distance and second positions thereof where therein they are spaced outwardly from the rear wheel by a smaller second predetermined distance. The mounting means preferably includes first and second mounting members for mounting the first and second training wheels, respectively, and each of the mounting members has opposite first and second sides. Further, the mounting members are preferably adapted so that they are reversible so that the first sides of the mounting members face inwardly toward the rear wheel when the training wheels are in respective first positions thereof and the second sides of the mounting members face inwardly toward the rear wheel when the training wheels are in respective second positions thereof.

It has been found that the training wheel assembly of the instant invention can be effectively utilized for increasing the stability of a bicycle while a young rider is developing his or her bicycling skills and that the training wheel assembly is adjustable to reduce the level of support and stability provided by the training wheels as the riding skill of the user is increased. Specifically, it has been found that by reversing the positions of the mounting members in order to move the training wheels inwardly rather than upwardly, the amount of the overall support and stability provided by the training wheels can be reduced without causing the bicycle to be prone to wobbling from side-to-side as it is supported by the training wheels.

Accordingly, it is a primary object of the instant invention to provide an effective training wheel assembly for a bicycle.

Another object of the instant invention is to provide a training wheel assembly comprising a pair of mounting members and a pair of training wheels, wherein the mounting members are adapted for adjustably mounting the training wheels so that they are movable inwardly rather than upwardly relative to the rear wheel of a bicycle.

An even further object of the instant invention is to provide an effective training wheel assembly for a bicycle which is adjustable for reducing the level of support provided by the training wheels thereof without making the bicycle unstable and wobbly.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
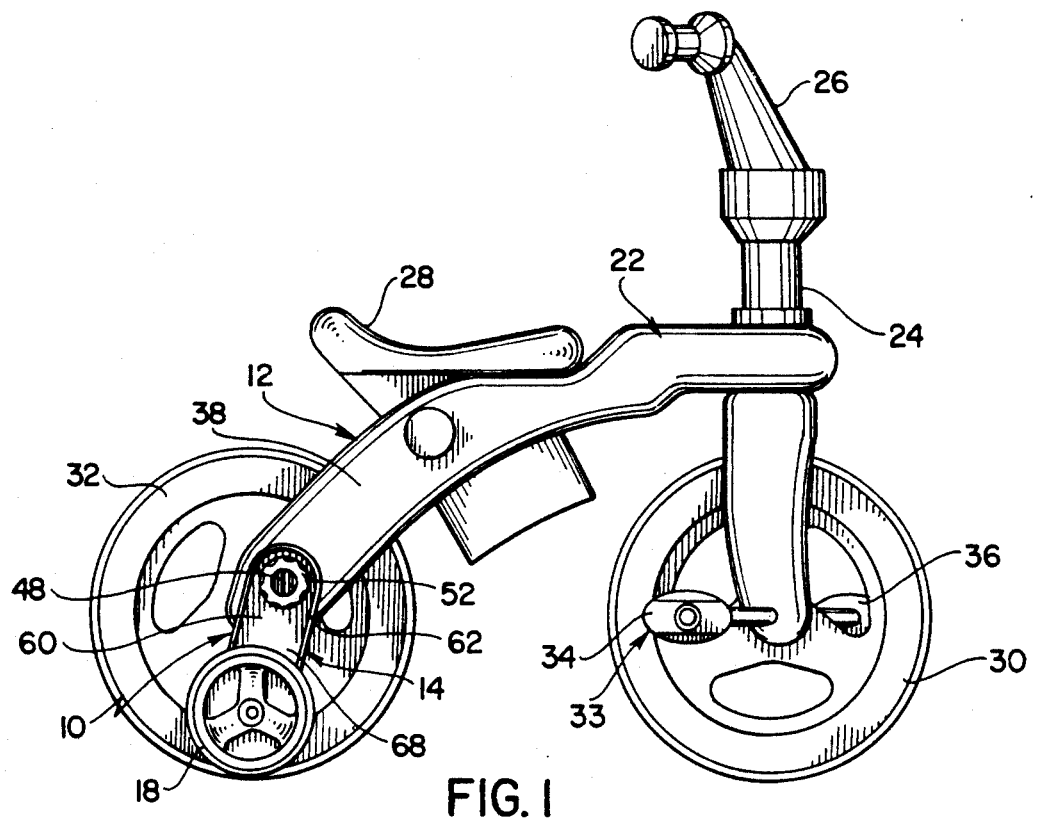
FIG. 1 is a side elevational view of a bicycle with the training wheel assembly of the instant invention mounted thereon with the training wheels in the first positions thereof.

Referring now to the drawings, the training wheel assembly of the instant invention is illustrated and generally indicated at 10 in FIGS. 1 through 4. The training wheel assembly 10 is adapted for use in combination with a bicycle generally indicated at 12 and it comprises a right side portion or section generally indicated at 14, and a left side portion or section generally indicated at 16. The right and left portions 14 and 16, respectively, each include a training wheel 18 and a mounting member assembly generally indicated at 20, and they are adapted so that they are each independently reversible for alternatively mounting the training wheels 18 thereof in the first positions illustrated in FIGS. 1 and 3, or the second positions illustrated in FIGS. 2 and 4, in order to adjust the amount of support provided by the training wheel assembly 10 depending on the skill of a rider of the bicycle 12.

Figure 5:
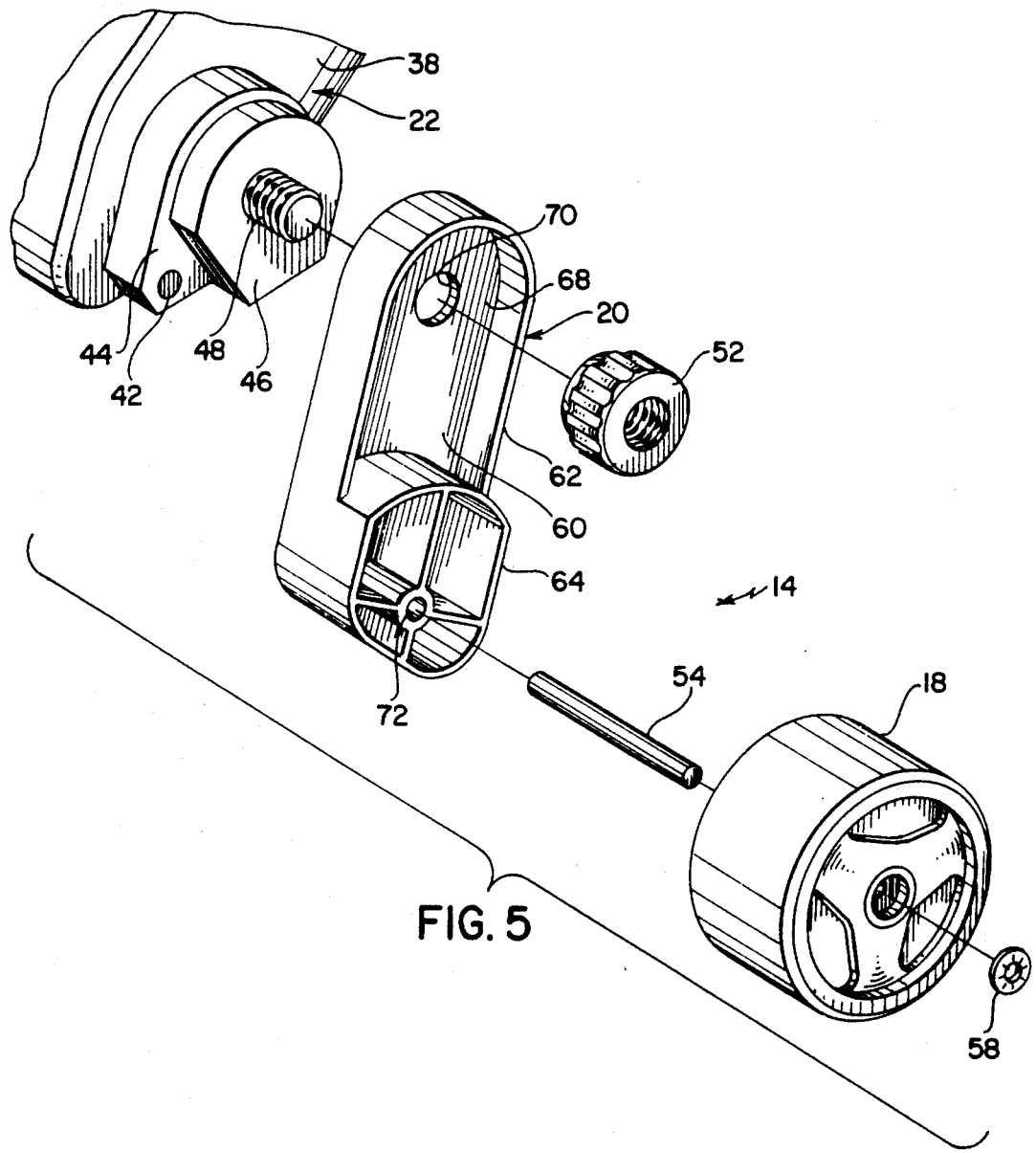
FIG. 5 is an exploded perspective view of one side section of the training wheel assembly.

The bicycle 12 is of generally conventional construction and it comprises a main frame element 22, a front fork portion 24, a handlebar portion 26, a seat 28, and front and rear wheels 30 and 32, respectively, all of which are preferably molded from a suitable durable plastic material. The front fork portion 24 is rotatably mounted in the frame element 22 adjacent the front end thereof and the handlebar portion 26 is secured to the upper end of the front fork portion 24. The front wheel 30 is rotatably received in the front fork portion 24 and a pedal assembly generally indicated at 32 comprising right and left pedals 34 and 36, respectively, is rotatably mounted in the front fork portion 24 in coaxial relation with the front wheel 30. The pedal assembly 33 is secured to the front wheel 30 in non-rotatable relation so that the pedals 34 and 36 can be manually operated with the feet of a rider for rotating the front wheel 30. The seat 28 is secured to the frame element 22 in a central location. The rear portion of the frame element 22 is formed in a bifurcated configuration so that it includes right and left side sections 38 and 40, respectively, and the rear wheel 32 is rotatably mounted on an axle 42 which extends between the right and left side sections 38 and 40, respectively. As illustrated in FIG. 5, each of the side sections 38 and 40 includes an enlarged outwardly extending boss 44 having a reduced further outwardly extending boss 46 formed thereon. Further, a threaded shaft 48 extends outwardly from the reduced outer boss 46 on each of the side sections 38 and 40.

Each of the right and left sections 14 and 16, respectively, of the training wheel assembly 10 comprises a mounting member assembly 20, a threaded nut 52, a shaft 54, a training wheel 18 and a retaining ring 58. Each of the mounting member assemblies 20 is preferably integrally formed from a suitable rigid plastic material and each includes a main vertical wall 60 having a perimeter wall 62 thereon and a lower frame section 64. Each mounting member assembly 20 has a first side 66 and a second side 68, and the lower frame section of each mounting member assembly 20 extends outwardly from the main wall 60 thereof on the second side 68 thereof to provide a section of increased width adjacent the lower end of each mounting member assembly 20.

An aperture 70 which is dimensioned for receiving one of the threaded shafts 48 therein, is formed in the main wall 68 of each mounting member assembly 20 proximal of the upper end thereof and a tubular member having a reduced aperture 72 therein extends through the lower portion of each mounting member assembly 20. Each of the mounting member assemblies 20 is formed so that it is alternatively receivable on the frame 22 so that the first side 66 thereof faces inwardly toward the frame 22, or so that the second side 68 thereof faces inwardly toward the frame 22. In either case, however, each of the mounting member assemblies 20 is received on the frame 22 so that the respective shaft 48 thereof extends through the aperture 70 therein and so that the main wall 60 thereof is received in mating engagement with the respective adjacent reduced inner boss 46. When the mounting member assemblies 20 are received on the frame 22 in this manner, the outer wall 62 of each of the mounting member assemblies 20 extends around the perimeter of the respective adjacent boss 46 to prevent the mounting member assembly 20 from rotating about the respective threaded shaft 48 thereof. The nuts 52 are received in threaded engagement on the shafts 48 for retaining the mounting member assemblies 20 in assembled relation with the frame 22. Each of the shafts 54 is permanently secured in the aperture 72 of the respective mounting member assembly 20 thereof so that it extends outwardly from the enlarged frame portion 64 thereof, and each of the training wheels 18 is rotatably secured on the respective shaft 54 thereof with the respective retaining ring 58 thereof. Each of the training wheels 18 is preferably also integrally molded from a suitable plastic material and each preferably has a substantially cylindrical circumferential configuration.

Figure 2:
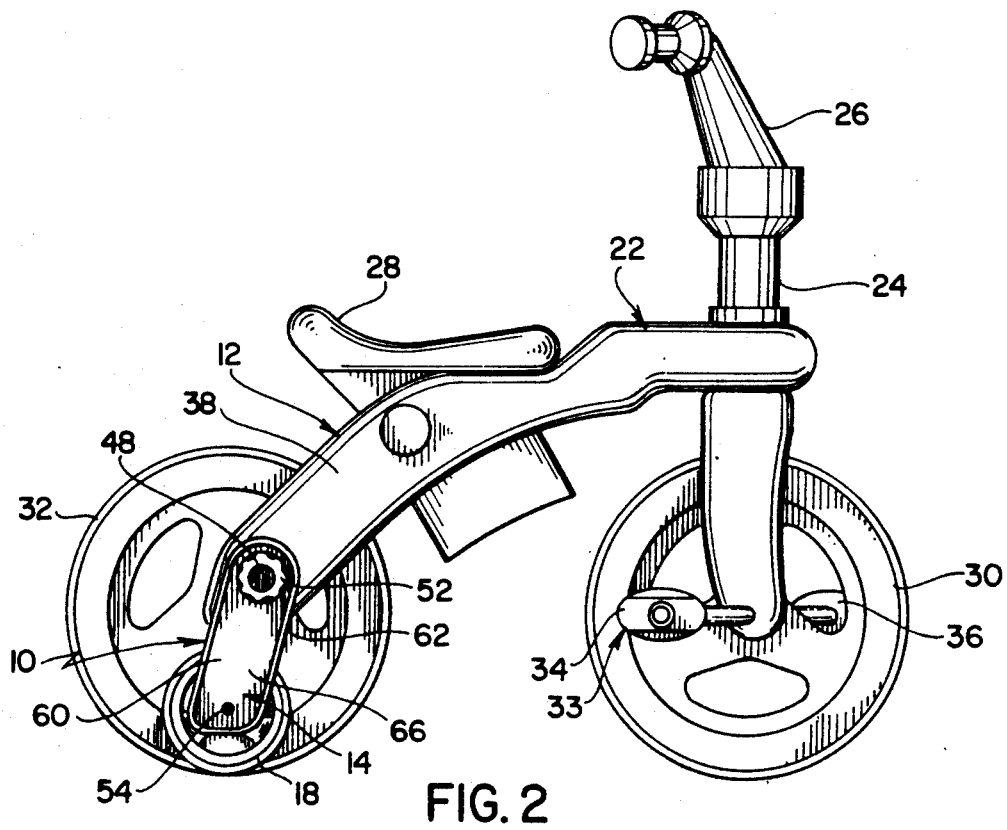
FIG. 2 is a similar view with the training wheels in the second positions thereof.
Figure 3:
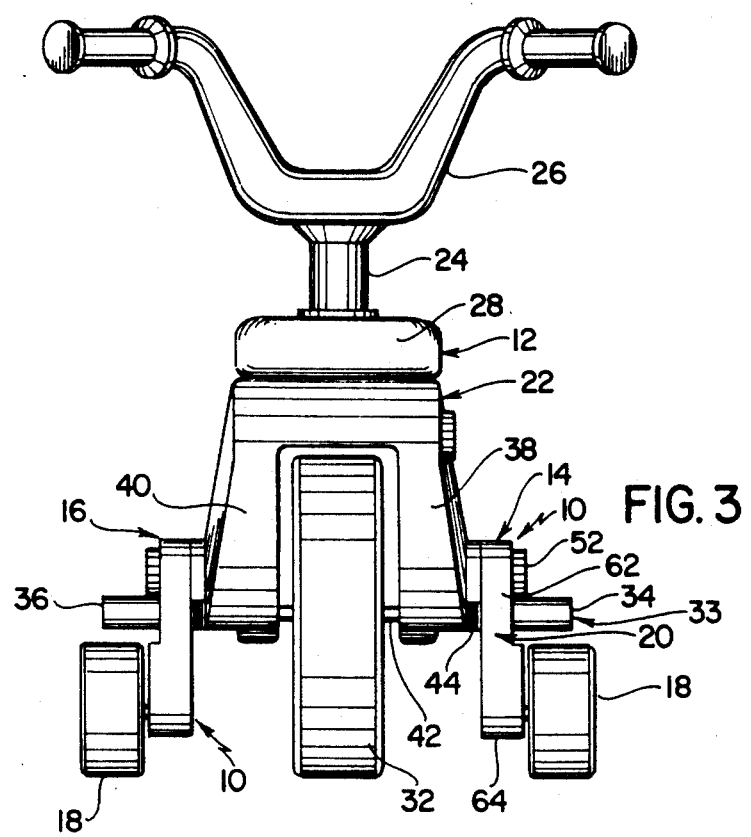
FIG. 3 is a rear elevational view of a bicycle with the training wheels in the first positions thereof.
Figure 4:
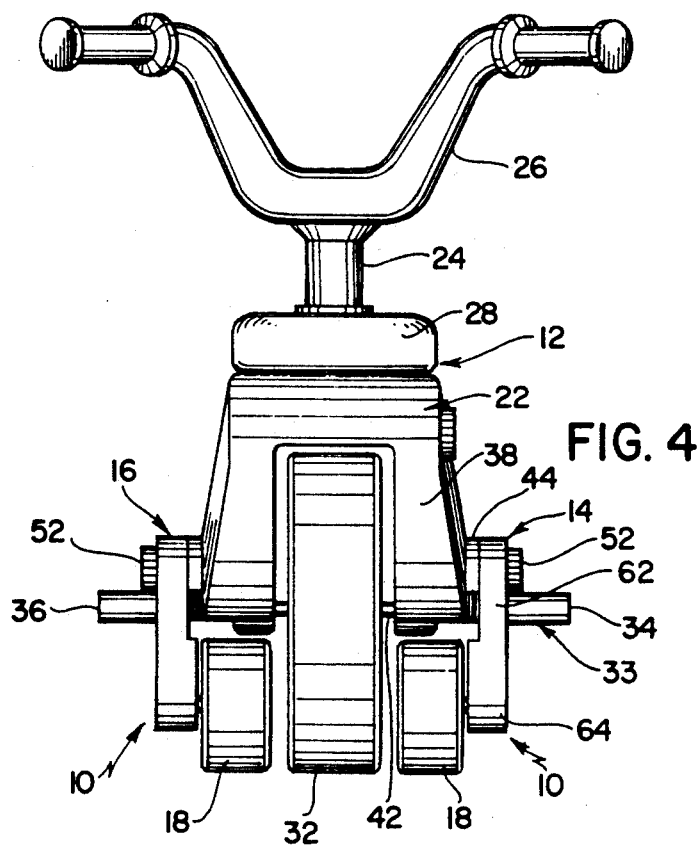
FIG. 4 is a similar view with the training wheels in the second position thereof.

For use and operation of the bicycle 12 in combination with the training wheel assembly 10 the right and left sections 14 and 16, respectively, are preferably initially installed in first positions thereof on the bicycle 12 so that the first sides 66 of the right and left sections 14 and 16, respectively, face inwardly toward the rear wheel 32 and the frame element 22 as illustrated in FIGS. 1 and 3. When the training wheel assembly 10 is assembled on the bicycle 12 in this manner the training wheels 18 are positioned in outwardly spaced relation to the rear wheel 32 so that they are operative for contacting a supporting surface on which the bicycle 12 is received for maintaining the bicycle 12 in a substantially upright disposition. As will be noted, when the side sections 14 and 16 are assembled on the bicycle 12 in this manner, the training wheels 18 are positioned in well outwardly spaced relation to the rear wheel 32 so that they are operative for adding a substantial degree of stability to the bicycle 12. Once an operator has gained a certain level of proficiency at riding the bicycle 12 with the side sections 14 and 16 in the respective first positions thereof, the positions of the side sections 14 and 16 can be reversed so that the second sides 68 of the mounting member assemblies 20 face inwardly toward the rear wheel 32 and the frame 22, as illustrated in FIGS. 2 and 4. As will be noted, when the training wheel assembly 10 is assembled on the bicycle 12 in this manner, the training wheels 18 are positioned in closely spaced relation to the rear wheel 32 so that they provide substantially less stability and support to the bicycle 12. Accordingly, when the sections 14 and 16 are in the second positions thereof a rider of the bicycle 12 must utilize a substantially greater level of skill to maintain the bicycle in an upright disposition. However, since the training wheels 18 are positioned at substantially the same elevation regardless of whether they are in the first positions thereof or the second positions thereof, the bicycle 12 is not normally prone to wobbling back and forth during a bicycling exercise.

It is seen therefore that the instant invention provides an effective training wheel assembly for a bicycle. The training wheel assembly 10 is adjustable to provide a reduced level of stability and support for the bicycle 12 after a rider has developed a certain level of proficiency at riding the bicycle 12. However, because the training wheels 18 are moved inwardly relative to the rear wheel 32 rather than upwardly when they are in the second positions thereof, the bicycle 12 is not prone to wobbling back and forth. Hence, it is seen that the training wheel assembly of the instant invention represents a significant improvement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. In a training wheel assembly for a bicycle wherein the bicycle is of a type which is operative on a supporting surface and includes a frame and front and rear wheels mounted on the frame, said training wheel assembly comprising first and second training wheels and mounting means for mounting said first and second training wheels on said frame adjacent opposite sides of said rear wheel so that they are operative for contacting said supporting surface to maintain said bicycle in a substantially upright disposition, the improvement comprising said training wheels being repositionable between respective first positions thereof wherein they are each spaced outwardly from said rear wheel by a first predetermined distance and respective second positions thereof wherein they are each spaced outwardly from said rear wheel by a second predetermined distance which is less than said first predetermined distance.

2. In the training wheel assembly of claim 1, said mounting means including first and second mounting members for mounting said first and second training wheels, respectively.

3. In the training wheel assembly of claim 2, said first and second mounting members each having opposite first and second sides, said mounting members being reversible for repositioning said first and second mounting members between the first and second positions thereof, the first sides of said mounting members facing inwardly toward said rear wheel when said training wheels are in the respective first positions thereof, the second sides of said mounting members facing inwardly toward said rear wheel when said training wheels are in the respective second positions thereof.

4. In the training wheel assembly of claim 1, said training wheels having fixed vertical positions relative to said rear wheel.

5. In the training wheel assembly of claim 1, said training wheels being repositionable on said frame between the respective first positions thereof and the respective second positions thereof.

6. In combination, a bicycle and a training wheel assembly on said bicycle, said bicycle being operative on a supporting surface and including a frame and front and rear wheels mounted on said frame, said training wheel assembly comprising first and second training wheels and mounting means for mounting said first and second training wheels on said frame adjacent opposite sides of said rear wheel so that they are operative for contacting said supporting surface to maintain said bicycle in a substantially upright disposition, said mounting means mounting said training wheels so that they are repositionable between respective first positions thereof wherein they are spaced outwardly from said rear wheel by a first predetermined distance and respective second positions thereof wherein they are spaced outwardly from said rear wheel by a second predetermined distance which is less than said first predetermined distance.

7. In the combination of claim 6, said mounting means including first and second mounting members for mounting said first and second training wheels, respectively, said first and second mounting members each having opposite first and second sides, said mounting members being reversible for repositioning said first and second mounting members between the respective first and second positions thereof, the first sides of said mounting members facing inwardly toward said rear wheel when said training wheels are in the respective first positions thereof, the second sides of said mounting members facing inwardly toward said rear wheel when said training wheels are in the respective second positions thereof.

8. In the combination of claim 7, said mounting means mounting said training wheels in vertically fixed positions relative to said rear wheel.

9. In the combination of claim 7, said training wheels being repositionable on said frame between the respective first positions thereof and the respective second positions thereof.

* * * * *